United States Patent [19]

Kitajima et al.

[11] 4,155,810
[45] May 22, 1979

[54] TREATING OF WASTE PHOTOGRAPHIC PROCESSING SOLUTIONS AND SILVER RECOVERY THEREFROM USING CHEMO-SYNTHETIC SULFUR BACTERIA

[75] Inventors: Masao Kitajima, Asaka; Akira Abe, Tokyo, both of Japan

[73] Assignee: Fuji Photo Film Co., Ltd., Minami-ashigara, Japan

[21] Appl. No.: 848,425

[22] Filed: Nov. 3, 1977

[30] Foreign Application Priority Data

Nov. 9, 1976 [JP] Japan .................................. 51-133701

[51] Int. Cl.$^2$ .......................... C02C 1/02; C07B 29/02
[52] U.S. Cl. ........................................... 195/2; 210/15
[58] Field of Search .............................. 195/2; 210/15; 75/101 R

[56] References Cited

U.S. PATENT DOCUMENTS

| 3,305,353 | 2/1967 | Duncan et al. | 195/2 |
| 3,455,679 | 7/1969 | Mayling | 75/101 R |
| 3,537,986 | 11/1970 | Watanabe et al. | 210/15 |
| 4,033,763 | 7/1977 | Markels | 210/15 |

*Primary Examiner*—Alvin E. Tanenholtz
*Attorney, Agent, or Firm*—Sughrue, Rothwell, Mion, Zinn and Macpeak

[57] ABSTRACT

A method for treating a waste photographic processing solution containing a silver-sulfur compound comprising applying chemo-synthetic sulfur bacteria to the waste solution under aerobic conditions.

18 Claims, No Drawings

TREATING OF WASTE PHOTOGRAPHIC PROCESSING SOLUTIONS AND SILVER RECOVERY THEREFROM USING CHEMO-SYNTHETIC SULFUR BACTERIA

BACKGROUND OF THE INVENTION

1. Field of the Invention

This invention relates to a method of treating or decontaminating waste photographic processing solutions containing sulfur compounds of silver and a method of recovering silver using chemo-synthetic sulfur bacteria, and in particular, to a novel method by which the oxidation of thiosulfate ion, i.e., environmental decontamination of the wastes and silver recovery through accumulation in bacteria cells are accomplished either simultaneously or succesively depending on the purposes.

2. Description of the Prior Art

Of various processing solutions for silver halide photography now employed in practical use, the developer solution and the fixer solution are the most fundamental. The fixer solution, which is employed to dissolve and remove silver halide remaining in the unexposed areas after development, comprises, in addition to a high concentration of thiosulfate salt as a principal agent, sodium sulfite, acetic acid, potassium bromide, etc. The fixer used for processing and which has become exhausted contains, as a sulfur compound of silver, solubilized silver ion in the form of silver thiosulfate complexes, and the other components described above. Hence, the waste fixer solution has very high values for various indicators of the degree of environmental contamination, such as BOD (biological oxygen demand), COD (chemical oxygen demand) and TOD (total oxygen demand). Decontamination or treatment to drastically reduce these oxygen demand values is required. The activated-sludge process is widely used to decontaminate waste waters which contain various substances. But, unfortunately among the various components, the thiosulfate salt, which is present in the largest concentration in the waste fixer solution cannot easily be oxidized using a conventional activated-sludge treatment (e.g., as disclosed in *Kodak Publication* Nos. J-28, J-41 and J-46, Eastman Kodak Company, Rochester N.Y. 14650), and an efficient treatment needs to be developed.

On the other hand, silver which is present in the waste fixer solution has been recovered using various methods including electrolysis (e.g., as disclosed in *Kodak Publication* No. J-10, Eastman Kodak Company, Rochester N.Y. 14650). However, when the concentration of silver is about 100 mg/l or less, no attempts have been made for a practical recovery. Accordingly, concentration of silver to such a degree that easy recovery is possible is desirable from the viewpoint of conservation of silver as a valuable resource.

SUMMARY OF THE INVENTION

An object of the present invention is to provide a method to accomplish the two tasks described above, i.e., treating or decontamination of waste photographic solutions and concentration and recovery of silver simultaneously or separately depending on the purposes. The present invention is based on the discovery that some chemo-synthetic sulfur bacteria, particularly those belonging to the Thiobacillus family, rapidly grow and propagate (or proliferate) under aerobic conditions utilizing reductive sulfur compounds as electron donors. It is considered that the bacteria efficiently take up the silver ions as a part of the donors present in the photographic waste and accumulate the silver in the cells thereof. During growth and propagation (or proliferation), the bacteria take up and metabolize various additional components such as acetic acid, carbonate ion, inorganic ions such as ammonium ion, sodium ion or potassium ion as the sources of carbon, nitrogen and inorganic ions. Therefore, the utility of the present method will further increase if an improvement is achieved in making use of the bacteria cells as fertilizers or feed stuffs.

Accordingly, the present invention provides the following embodiments.

In a first embodiment, the invention provides a method of treating or decontaminating waste photographic processing solutions containing sulfur compounds of silver which comprises applying chemo-synthetic sulfur bacteria to a waste photographic processing solution containing a sulfur compound of silver under aerobic conditions.

In a second embodiment of the invention, the invention provides a method of recovering silver from a waste photographic processing solution containing a sulfur compound of silver, comprising applying chemo-synthetic sulfur bacteria to the waste photographic processing solution, cultivating the bacteria under aerobic conditions so as to accomulate the silver or the silver compound in the bacterial cells, and finally separating and collecting the bacterial cells.

DETAILED DESCRIPTION OF THE INVENTION

Among various chemo-synthetic bacteria, chemo-synthetic sulfur bacteria are those which can utilize reductive sulfur compounds as the source of energy. Thus, biological activities such as metabolism, growth, propagation, etc. of the chemo-synthetic sulfur bacteria on the basis of the energy which they acquire due to such reducing capability occurs including, taking in water, oxygen, sources of carbon and nitrogen as well as inorganic salts. As the result of these biological activities, the reductive sulfur compounds are oxidized to the highest oxidation state of sulfur, i.e., that of sulfur in sulfuric acid or a sulfate salt, while the carbon or nitrogen sources, inorganic salts, etc., are supplied for the synthesis of bacterial cells or physiologically active compounds via various metabolic processes. Aerobic conditions are employed and such are considered to exist where the cultivation solution contains greater than about 0.05 mg of oxygen per liter.

A number of compounds ordinarily present in the photographic fixer solution include those useful for the growth of chemo-synthetic sulfur bacteria; for example, acetic acid and carbonate salts can serve as carbon sources, and metal cations such as sodium or potassium as well as anions such as chloride are all essential for the growth of the microorganism. Further, thiosulfate and sulfite salts which are present in very high concentrations preferably serve as the reductive sulfur compounds, of which ammonium thiosulfate is most adapted for the growth of bacteria since this salt contains nitrogen, as well. For the cultivation of chemo-synthetic sulfur bacteria using the waste photographic fixer solution, other indispensable components need be added to the waste solution, including phosphate salts, iron, magnesium, calcium, etc. Still other elements required in trace amounts, i.e., cations of metals such as iron, magnesium, manganese, and cobalt for bacterial growth are not of serious concern, since they are usually present in normal water supplies in sufficient amounts.

In practice, application of chemo-synthetic sulfur bacteria to a waste photographic processing solution can be achieved in various ways; for example they can be admixed with the waste solution in a batch system or a continuous flow system, they can be supplied into the waste solution as a high concentration innoculum which has been cultivated separately or in a very diluted suspension to be cultivated to grow, propagate (or proliferate) etc. in the waste solution.

They can be applied as a column in which they are packed and stabilized so that a waste solution can be passed through the column so that the solution contacts the bacteria for a certain period of time during which the purification of the solution or accumulation of silver takes place.

They can be applied also as a fixed bed in which they are immobilized on a solid substrate and a waste solution is passed through the bed. In all these cases the chemo-synthetic sulfur bacteria can be applied either in their biologically active form, a cell state in which the bacteria can grow or propagate actively, or in an inactive form, a cell state in which the bacteria can not grow or propagate actively or are incapable of cell division.

Since chemo-synthetic sulfur bacteria consume molecular oxygen for oxidative reactions and respiration, an abundant supply of oxygen is necessary during cultivation. The oxygen supply can be carried out by forcing air under pressure into the solution or by vigorous stirring. Grown cells are removed from the waste solution by sedimentation, centrifugal separation, filtration, etc. and addition of a coagulating agent or heat treatment is effective to facilitate the separation of the bacterial cells.

A waste fixer solution used in silver salt photography contains a large amount of silver dissolved therein from the unexposed portions of silver salt photographic materials in the form of silver-thiosulfate complex salts. Since silver itself is a very valuable metal, various attempts have hitherto been made for recovering silver from waste fixer solutions (see "Recovering Silver from Photographic Materials" *Kodak Publication* No. J-10, 1972, Eastman Kodak Company, Rochester, N.Y.). For example, practically employed processes, include a process in which a wire gauze of a metal having a higher oxidation potential than that of silver, such as iron and aluminum, is placed in a waste fixer solution and silver deposits thereon due to the difference in ionization tendency (or electromotive force) and the metallic silver thus deposited is recovered, a process in which metallic silver deposited on a cathode disposed in a waste fixer solution is recovered by electrolysis, and a chemical process in which a reactant capable of forming a sparingly water-soluble compound or complex is added to a waste fixer solution to recover silver as a precipitate of a silver salt or sodium borohydride is added to a waste fixer solution to precipitate and recover silver as reduced silver. These processes, however, have both advantages and disadvantages and hence they can not always be utilized optimally under all circumstances.

That is, although the electrochemical process involving immersing a wire gauze of the metal is a process which can be easily practiced, the process must be carried out under conditions such that the concentration of silver-thiosulfate complex salts in the waste fixer solution is comparatively high. Further, in the process the iron ions or aluminum ions dissolve into the waste solution by the replacement reaction with silver ions to contaminate the waste solution.

The electrolytic process may be a more desirable process but this process is less advantageous in the point of cost since the process needs additional appropriate equipment and further the process uses a large amount of electric power. A high concentration of silver thiosulfate complex salts is also required. Furthermore, it is necessary, in the electrolytic process, to attempt to utilize the equipment effectively by collecting large amounts of highly concentrated silver-containing waste solutions from each location where the fixer solution is actually used.

The chemical process described above is accompanied by the possibility of a secondary contamination of the waste solution by the reactant added.

The present invention also provides a method of recovering silver by treating the waste fixer solution with chemo-synthetic sulfur bacteria, in particular, with bacteria of the Thiobacillus family, and accumulating the silver in the bacterial cells. In comparison with the various, conventional methods described above, the method of the present invention offers many advantages such as an extended applicability to waste solutions with a lower silver salt concentration, e.g., as low as 0.01 ppm, a greater reduction of the silver salt concentration using this treatment, etc. However, the most significant advantage of the present invention is indicated by the values for BOD, COD, TOD, etc. which are indicators of the degree of contamination with chemical species such as reductive sulfur compounds, ammonia, carbonic acid and acetic acid, etc., present in the waste fixer solution after the treatment in accordance with the present invention. In other words, decontamination of the waste solution is accomplished simultaneously with silver recovery, because most of these compounds which are responsible for the high oxygen demand values are consumed or digested as electron donors in the chemo-synthetic activity of the bacteria or as the nutrient sources thereof.

Processes of separating silver from the cells of the bacteria, include a process wherein organic materials are removed by incineration and a process wherein the cells of the bacteria having silver captured therein are treated with a solution containing a surface active agent, strong alkali or strong acid, a bacteriophage, or autolytic enzyme (or proteolytic enzyme) to dissolve the cells of the bacteria and precipitate sparingly soluble silver and/or silver salts, which are recovered and purified. More specifically, highly active surface active agents which destroy or solubilize cell membranes are suitable for recovering silver. Anionic surfactants such as sodium dodecyl sulfate, sodium dodecyl benzene sulfonate, etc. or cationic surfactants such as lauryl ammonium chloride, lauryl dimethyl amine oxide etc. are suitable examples of surface active agents which can be employed.

Various forms of the silver-thiosulfate complex salts usually present in the photographic waste fixer solution, depending on the pH or the ionic strength of the complex, are known to exist. Under ordinary conditions, $[Ag(S_2O_3)_2]^{3-}$ is thought to be the predominant species. Although $Ag^+$ is known to be quite harmful to the ordinary growth of microorganisms and bacteria, what influences the silver thiosulfate complex salts has on the metabolism of the bacteria are not at present known.

The present invention is based on the discovery that chemo-synthetic sulfur bacteria cultivated in waste photographic fixer solution take in the silver thiosulfate complex salts and accumulate the silver in the form of a sparingly soluble silver salt. Although the amount and the rate of uptake of the silver salt into the bacterial cells depend on various factors such as bacterial species, the concentration of the silver complex salts, the rate of air aerated, the composition and the pH of cultivating solution, etc., it is rather easy in practice for the total amount of the silver salt accumulated to be more than 10% by weight of the total weight of the bacterial cells on dry basis. On the other hand, it has been found that the silver concentration in the treated waste solution can be reduced to below about 1 ppm by such cultivation.

According to the present invention, one can concentrate and recover silver directly from the waste fixer solution by appropriately adjusting the amount of bacteria. From a practical point of view, however, higher efficiencies of silver recovery can be attained by diluting the waste fixer solution with a suitable solution so as to control the ionic composition and concentration well to meet the growth conditions for the bacteria used. Suitable diluents include city water, waste water, effluents resulting from the washing of photographic materials, waste developer solutions or waste which has been already treated with bacteria. To such diluents are added salts essential for the growth of the bacteria.

The method of the present invention, which may be practiced in either a batch or continuous manner, generally requires an abundant supply of oxygen to ensure an active prosperous propagation of bacteria of the family Thiobacillus.

Oxygen can be supplied by bubbling air into the reaction tank. Alternatively, the mixture can be spread in the form of a thin layer or the mixture can also be stirred to facilitate effective contact of the cultivating solution with air.

A suitable oxygen content for the cultivating solutions can range from about 0.05 mg of $O_2/l$ to about 100 mg of $O_2/l$ of water, preferably about 1 mg of $O_2/l$ of water to a saturation amount dissolved at 1 atm. (e.g., up to about 50 mg of $O_2/l$ of water which is the saturation amount of oxygen dissolved in water at 1 atm. and at 25° C.). If the saturation amount is lower than about 50 mg of $O_2/l$ of water, then the effective amount can be increased by aeration and the like, i.e., resulting in an apparent increase in the saturation amount.

For the purpose of treating a large amount of waste solution, a continuously operating apparatus comprising an aeration tank and a precipitation tank is preferred as in the case of the treatment (or decontamination) apparatus based on the activated sludge process. It is self-evident that still other types of treating systems are applicable depending on the specific purposes and situations involved. One can utilize a column charged with a certain species of bacteria appropriate for the present method and allow the waste solution to flow through such a column and be decontaminated.

The efficiency of silver recovery from the waste fixer solution containing silver complexes broadly varies according to the silver concentration, the amount of bacteria used, and other treating parameters either in a batch or continuous treatment. Generally speaking, however, a substantially complete removal of silver from the waste fixer solution is possible by subjecting the waste fixer solution to more than one bacterial treatment, i.e., by recirculation, or by adding a fresh amount of bacteria which have been cultivated elsewhere and which do not contain any silver therein to the previously treated waste. Further, the present method may be combined with other silver recovering treatments; for example, after most of the silver ion in the waste fixer solution has been precipitated in the form of sulfide using hydrogen sulfide or sodium sulfide, the resulting supernatant may be mixed with chemo-synthetic sulfur bacteria.

The temperature at which the biological activities of the chemo-synthetic sulfur bacteria used in the present invention can occur ranges from about 0° C. to about 70° C. depending on the bacterial species. The method of the present invention is more effective at an temperature between 5° and 60° C., more preferably between 10° and 55° C. and most preferably between 20° and 50° C. Outside these temperature ranges, the life of the bacteria is only sustained or a very low rate of conversion of the sulfur compounds by organisms tends to occur, making thus the present method practically ineffective.

It is important for the biological activity of the chemo-synthetic sulfur bacteria for the environmental chemical composition to be suitable for the biological activity for the bacteria and also the hydrogen ion concentration of the environment be in an acidic region to a weakly alkaline region. Since an ordinary waste fixer solution itself is weakly acidic, it is unnecessary further, to adjust the pH of the waste fixer solution prior to the cultivation treatment when such a waste fixer solution is treated alone but since a waste developer solution is alkaline, the pH of the waste fixer solution to be treated can be easily adjusted to a pH range of not higher than 8, preferably about 3 to about 8, suitable for the biological activity of the chemo-synthetic sulfur bacteria by adding a waste developer solution thereto.

The cells of the bacteria after completion of the biological treatment can be easily removed as precipitates by centrifugation, by settling the cell suspension for a certain period of time, by the addition of a protein flocculant, by filtration, by agitation or by the application of a heat treatment, an ultrasonic wave treatment, an ultraviolet-light irradiation treatment, an X-ray irradiation treatment, a contract treatment with air or an inert gas, a freezing treatment, treatment by passing an electric current therethrough, etc. Two or more treatments described above can also effectively be employed in combination. A protein flocculant is a chemical substance capable of markedly decreasing the solubility or dispersion stability of a protein or cell membrane without influencing the chemical formulation and molecular weight thereof. Suitable protein flocculants include acids, alkalis, urea, guanidine, organic solvents, detergents, heavy metals, trichloroacetic acid, potassium thiocyanate, proteinases, isocyanates, isothiocyanates, aldehydes, active carbons and compounds containing active halogens. These treatments facilitate a reduction in the degree of contamination of the waste solution by oxygen consuming compounds originating from the bacteria. Also, it is possible to recover silver from the cells of the bacteria containing the silver precipitated and accumulated in the cells.

Although the present method has proved to be most appropriate for the decontamination of an effluent comprising a silver-containing waste photographic fixer solution, it is also applicable to various other effluents containing reductive sulfur compounds. Such effluents include, for example, photographic processing solutions which have been accidentally discarded without being used for processing, and a photographic processing solution from which a substantial amount of silver has been removed using certain other methods.

Chemo-synthetic sulfur bacteria which are suitable for use in the present invention are those whose energy source arises from the oxidation of reduced or partially reduced sulfur compounds and are of the genera
1. Thiobacillus
2. Sulfolobus
3. Thiobacterium
4. Macromonas
5. Thiovulum
6. Thiospira of which the genus Thiobacillus is most suitable for use in this invention. Specific examples include the following which are classified as Thiobacilli.

*Thiobacillus thioparus*
*Thiobacillus novellus*
*Thiobacillus thiooxidans*
*Thiobacillus thiocyanooxidans*
*Thiobacillus ferrooxidans*
*Thiobacillus denitrificans*

This classification is based on the method of W. Vishniac and M. Santer *Bacteriology Reviews* Vol. 21, page 195-213 (1957), however, as is evident to those skilled in the art other thiobacilli which are different from those listed above can be employed in the present invention. Among the above-mentioned Thiobacillus bacteria, all except *Thiobacillus novellus* are self-sustaining biologically, utilizing reductive sulfur compounds as the only electron donor, while *Thiobacillus novellus* can utilize organic compounds such as acetic acid, malic acid, succinic acid, etc. as electron donors, too.

In practicing the present invention, one may use one or more species belonging to the Thiobacillus family together. Further, one may employ bacteria of different families which can be cultivated under conditions similar to those appropriate to Thiobacillus bacteria. Such bacteria are those in activated sludge.

In addition to the descriptions given heretofore as to the principle and the advantages of the present invention which is related to silver recovery from waste photographic fixer solution by the use of chemo-synthetic sulfur bacteria, several specific examples will be set forth hereinafter for an even better understanding of the invention. Unless otherwise indicated hereinafter, all parts, percents, ratios and the like are by weight.

EXAMPLE 1

200 ml of a Standard Solution (I) of the following composition to which 2 g $Na_2S_2O_3 \cdot 5H_2O$ had been added was inoculated with seed *Thiobacillus thioparus*. The total volume was poured into a one-liter long-neck flask, which was loaded in a stirrer and kept at 35° C. for cultivation. Standard Solution (I) was a solution containing the following salts in 1 liter of water; (pH=7.5):
$K_2HPO_4$—5 g
$MgSO_4 \cdot 7H_2O$—0.05 g
$NH_4Cl$—0.4 g
$FeCl_3 \cdot 6H_2O$—0.01 g
$CaCl_2 \cdot 2H_2O$—0.01 g In three days a bacterial dispersion which reached a steady-state bacteria concentration was obtained.

The dispersion was allowed to stand and the precipitated bacteria were removed. For the supernatant cultivating solution, the chemical oxygen demand (COD) was measured according to JISK-0101, -0102 and -0093 (which substantially correspond to ASTM D1291 and D1589); values of 2400 mg/l at the time of inoculation and 520 mg/l at the steady state, respectively, were obtained indicating that the COD was reduced makedly due to the oxidation and consumption of the thiosulfate ion caused by the bacterial propagation.

EXAMPLE 2

The same cultivating solution as described in Example 1 was inoculated with *Thiobacillus novellus*. The same procedure of cultivation was carried out to achieve a steady state bacteria concentration in three days. The COD values on commencing cultivation and at the point when the steady state was reached were 2300 and 300 mg/l, respectively.

EXAMPLE 3

The procedures described in Example 2 were repeated using 200 ml of the cultivating solution whereby the cultivated bacteria were separated by precipitation. The separated bacteria were dispersed in Standard Solution (I) to which had been added 24% by weight of a silver-containing waste fixer solution collected from a lith film automatic processor. Cultivation was carried out under the same conditions as described in Example 1 for three days. COD measurements made after the removal of the bacteria were 3000 mg/l at the start of cultivation and 700 mg/l after three days of cultivation, respectively, showing that this bacterial treatment decreased the COD of 23% of the initial level.

EXAMPLE 4

A continuous cultivating apparatus comprising a 3 liter volume aeration tank and a one liter volume precipitation tank was used. The cultivating solution was prepared by adding the following components to city water; 1% of a silver-containing waste fixer solution collected from a lith film automatic processor 0.05% of $KH_2PO_4$ and 0.1% of NaCl. To this solution was added 100 mg of *Thiobacillus novellus* which had been obtained from the steady state dispersion described in Example 2. While bubbling air at a rate of 2 l/min through bubbling tubes therein, the above-described diluted waste solution was fed to the tanks at a constant rate of 2 l/day. From time to time, the treated effluent was sampled, filtered with filter paper No. 5A, and the pH and COD were measured. In contrast to 800 mg/l COD for the initial state, the COD values decreased to 410 mg/l in one day, 320 mg/l in three days and finally to a steady state level of 275 mg/l after one week of treatment. At the same time, the pH of the solution changed from 7.2 to 5.8 correspondingly.

EXAMPLE 5

Using the same cultivation apparatus as described in Example 4, a treatment of a waste solution using *Thiobacillus thioparus* was conducted. The supplied solution was a waste fixer solution used for the processing of lith film (COD 78500 mg/l, $S_2O_3^{2-}$ 73.2 g/l) diluted twenty to fifty times with water to which the following inorganic salts were added: $KH_2PO_4$ 50 mg/l; $MgSO_4 \cdot 7H_2O$ 50 mg/l; NaCl 50 mg/l; $FeCl_3 \cdot 6H_2O$ 10 mg/l; and $CaCl_2 \cdot 2H_2O$ 10 mg/l.

This diluted waste solution was supplied to the tank at a rate of 1 liter/day, and the $S_2O_3^{2-}$ concentration and the COD of the solution in the tank were measured periodically. The results obtained are shown in Table I below.

Table I

| Originally Supplied Solution | | $S_2O_3^{2-}$ | | | COD | | |
|---|---|---|---|---|---|---|---|
| Content of Fixer Waste | Feeding Rate (liter/day) | Before Treatment | After Treatment | Rate of Reduction (%) | Before Treatment | After Treatment | Rate of Reduction (%) |
| 2% | 1 | 1460 | 298 | 80 | 1570 | 760 | 52 |
| 3% | 1 | 2190 | 590 | 73 | 2340 | 1230 | 47 |
| 5% | 1 | 3650 | 2370 | 35 | 3930 | 3050 | 22 |

EXAMPLE 6

*Thiobacillus novellus* was cultivated following the method described in Example 2 but with the exception that another waste fixer solution used for the processing of X-ray film, which contained 1.52 g/l of silver, was mixed with 150 ml of the cultivating solution. Cultivation was continued for 3 days with vigorous stirring using a stirrer at a temperature of 35° C. Then the bacteria were separated using a centrifuge (1000Xg for 10 minutes), and were redispersed in water and centrifugally separated twice and washed. All of the purified bacteria was dispersed in 25 ml of water containing 1 g of gelatin. All of the dispersion was then spread over a sheet of glass (78 cm²) and dried. The amount of silver on the glass sheet was measured by fluorescent X-ray analysis. Separately, 5 ml of the initial waste fixer solution was spread over another sheet of the same type of glass plate after having been mixed with 20 ml water containing 1 g of gelatin. The resulting plate was used as a control for the silver amount measurement. The results obtained are shown in Table II below.

Table II

| Content of Fixer Waste | Silver Amount ($\mu g/cm^2$) | Rate of Silver Recovery (%) |
|---|---|---|
| Control* | 44 | (100) |
| 3.3% | 40 | 91 |
| 6.7% | 28 | 32 |
| 13.4% | 25 | 28 |

*The Control corresponds to the total amount of silver present in the solution containing 3.3% of the waste fixer solution.

EXAMPLE 7

By using the same continuously operating, 4 liter volume cultivating apparatus as described in Examples 4 and 5, the accumulation of silver in *Thiobacillus thioparus* was investigated whereby an effluent from an automatic color film processor and from an automatic color paper processor was used. In this instance, the originally supplied solution contained not only the waste fixer solution but waste solutions resulting from development and washing. A solution having a COD value of 200 mg/l was fed to the apparatus at a rate of one liter/day. After the bacteria were filtered off with a No. 5B filter paper, the amount of silver remaining in the filtrate was measured using atomic light absorption.

The silver content of the treated solution in a steady state was 0.06 mg/l in contrast to 5.6 mg/l for the initially supplied solution. These values mean that 99% of the silver was accumulated in the bacterial cells by the present treatment.

On the other hand, the COD of the treated solution became as low as 56 mg/l.

While the invention has been described in detail and with reference to specific embodiments thereof, it will be apparent to one skilled in the art that various changes and modifications can be made therein without departing from the spirit and scope thereof.

What is claimed is:

1. A method of treating a waste fixing solution used for the fixing of silver halide photographic materials and containing at least one silver-thiosulfate complex salt comprising applying chemo-synthetic bacteria belonging to a genus Thiobacillus to said waste solution and cultivating said bacteria under aerobic conditions, whereby silver in said silver thiosulfate complex salts accumulates as silver, silver salts or silver and silver salts in the cells of said bacteria.

2. The method of claim 1, wherein said applying of said chemo-synthetic sulfur bacteria to said waste solution comprises adding an aqueous dispersion of said bacteria to said waste solution.

3. The method as claimed in claim 1, wherein the waste fixer solution is diluted with an aqueous diluent not containing a fixer in an amount of not less than 2 times by volume of the aqueous diluent to the volume of the waste fixer solution.

4. The method of claim 1, wherein the waste fixer solution is a waste fixer solution containing additionally waste photographic developer solution.

5. The method of claim 1, wherein said chemo-synthetic sulfur bacteria are *Thiobacillus thioparus, Thiobacillus novellus, Thiobacillus thiooxidans* or a mixture thereof.

6. The method of claim 1, wherein said chemo-synthetic sulfur bacteria are bacteria of the Thiobacillus family used in combination with one or more species of bacteria arising from activated sludge.

7. The method of claim 1, wherein the method is conducted at a temperature between about 5° and 55° C.

8. The method of claim 1, wherein the method is conducted at a pH of not more than about 8.

9. The method of claim 1, wherein said silver salts are sparingly soluble in water.

10. A method of recovering silver from a waste fixing solution used for the fixing of silver halide photographic materials and containing at least one silver-thiosulfate complex salt comprising applying chemo-synthetic sulfur bacteria belonging to the Thiobacillus family to said waste solution, cultivating said bacteria under aerobic conditions whereby silver in said silver thiosulfate complex salts accumulates as silver, silver salts or silver and silver salts in the cells of the bacteria, and subsequently separating the cells of the bacteria and recovering the silver therefrom.

11. The method of claim 10, wherein said applying of said chemo-synthetic bacteria to said waste solution comprises adding an aqueous dispersion of said chemo-synthetic bacteria to said waste solution.

12. The method of claim 10, wherein the waste fixer solution is diluted with an aqueous diluent not containing a fixer in an amount of not less than 2 times by volume of the aqueous diluent to the volume of the waste fixer solution.

13. The method of claim 10, wherein the waste fixer solution is a waste fixer solution containing additionally waste photographic developer solution.

14. The method of claim 10, wherein said chemo-synthetic sulfur bacteria are *Thiobacillus thioparus, Thioba-* cillus novellus, Thiobacillus thiooxidans or a mixture thereof.

15. The method of claim 10, wherein said chemo-synthetic sulfur bacteria are bacteria of the Thiobacillus family used in combination with one or more species of bacteria arising from activated sludge.

16. The method of claim 10, wherein the applying is at a temperature of between about 5° and 55° C.

17. The method of claim 10, wherein the applying is at a pH of not more than about 8.

18. The method of claim 10, wherein said silver salts are sparingly soluble in water.

* * * * *